United States Patent
Goldman

(10) Patent No.: US 7,594,169 B2
(45) Date of Patent: Sep. 22, 2009

(54) COMPRESSING, AND EXTRACTING A VALUE FROM, A PAGE DESCRIPTOR FORMAT FILE

(75) Inventor: Oliver Goldman, Redwood City, CA (US)

(73) Assignee: Adobe Systems Incorporated, San Jose, CA (US)

( * ) Notice: Subject to any disclaimer, the term of this patent is extended or adjusted under 35 U.S.C. 154(b) by 638 days.

(21) Appl. No.: 11/207,684

(22) Filed: Aug. 18, 2005

(65) Prior Publication Data

US 2008/0189601 A1 Aug. 7, 2008

(51) Int. Cl.
*G06F 15/00* (2006.01)
(52) U.S. Cl. .................................. 715/242; 707/101
(58) Field of Classification Search ............... 715/200, 715/209, 242; 341/55; 348/14.13; 707/101
See application file for complete search history.

(56) References Cited

U.S. PATENT DOCUMENTS

| | | | |
|---|---|---|---|
| 5,155,484 A | | 10/1992 | Chambers, IV |
| 5,704,060 A | * | 12/1997 | Del Monte ............... 707/104.1 |
| 5,832,530 A | * | 11/1998 | Paknad et al. ............ 715/235 |
| 6,886,130 B1 | * | 4/2005 | Unger et al. ............. 715/207 |
| 7,020,837 B1 | * | 3/2006 | Kueny .................... 715/234 |
| 7,072,061 B2 | * | 7/2006 | Blair et al. ............... 358/1.15 |
| 7,145,676 B2 | * | 12/2006 | Fan ......................... 358/1.15 |
| 2003/0133612 A1 | * | 7/2003 | Fan ......................... 382/199 |
| 2005/0015608 A1 | * | 1/2005 | Peterson ................... 713/193 |
| 2005/0091537 A1 | * | 4/2005 | Nisbet et al. ............. 713/201 |
| 2005/0216836 A1 | * | 9/2005 | Duke et al. ............... 715/531 |
| 2005/0234987 A1 | * | 10/2005 | Cyphers .................. 707/104.1 |
| 2006/0017804 A1 | | 1/2006 | Lee et al. |
| 2006/0041494 A1 | * | 2/2006 | Tinnirello et al. .......... 705/35 |
| 2006/0104526 A1 | * | 5/2006 | Gringeler et al. .......... 382/239 |

FOREIGN PATENT DOCUMENTS

GB 2354354 3/2001

OTHER PUBLICATIONS

Katz, P., 'Zip File Format', Aug. 1994, 'http://www.bsdg.org/swag.ARCHIVES/0022.PAS.html.*
APPNOTE.TXT, 'Zip File Format Specification version 4.5', Nov. 1, 2001, PKWare Inc.*
"Bureausoft", www.bureausoft.com/products.html, (Oct. 10, 2006).
"Search Report for Application No. GB615928.9", (Oct. 24, 2006).
Adobe Systems, Inc., "PDF Reference 5th edition—Adobe Portable Document Reference v. 6.1".

* cited by examiner

*Primary Examiner*—Cesar B Paula
(74) *Attorney, Agent, or Firm*—Schwegman, Lundberg & Woessner, P.A.

(57) ABSTRACT

Systems and methods provide mechanisms to create documents in page descriptor formats using file utilities that create compressed file formats. The resulting files may be rendered with a compressed file utility as well as a reader for the documents in page descriptor format.

32 Claims, 5 Drawing Sheets

COMPRESSING, AND EXTRACTING A VALUE FROM, A PAGE DESCRIPTOR FORMAT FILE

TECHNICAL FIELD

Various embodiments of the invention relate to compatibility between two or more file formats, and in particular, but not by way of limitation, to a system and method for creating compressed files (e.g., ZIP files) that are also compatible with a page descriptor language application (e.g., Adobe's Acrobat and Reader or the Metro application developed by Microsoft Corporation).

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND

Advances in computers, processing, communications, and networks have lead to an appreciable change in the manner in which information is represented in these systems. In particular, the concept of a document has changed appreciably in tandem with the evolution of computer systems and networks. For example, in the early days of computing, a document was basically limited to numbers, text, and a few special characters as represented in the ASCII or EBCIDIC formats. The concept of a document however has evolved to include features such as images, video, sound, and pages and portions of pages that can have multiple renditions. In short, documents have become more application-like.

One result of the increased complexity of machine-readable documents is the commensurate increase in size of these documents as stored in a machine-based memory. Quite simply, as the size of a document increases, the more memory it takes to store that document, the longer it takes to transmit that document over a network, and the longer it takes to download that document.

To address these and other problems associated with larger documents, documents (and files containing multiple documents) may be compressed, thereby decreasing the amount of storage such a document uses, decreasing the time that it takes to transmit the document over a network, and decreasing the time that it takes a recipient of the transmitted document to download the document. One such compressed format known in the art is the ZIP file format. Using one of a number of commercially available ZIP programs, a document, or a file containing multiple documents, wherein such document or documents may include text, graphics, video content, sound content, and other information, may be compressed into a ZIP file. Alternatively, by using one of a number of available programming languages, and by following the specification of a ZIP file format, one can write code that creates a ZIP file. After the creation of a ZIP file, any user can download and read the compressed file by running a ZIP file program to uncompress the file.

Page descriptor language formats are also used extensively in connection with document preparation and handling. One example page descriptor language format is the Portable Document Format (PDF) developed by the Adobe Corporation, San Jose, Calif. PDF files and documents provide for reliable electronic document distribution and exchange. When displayed, Adobe PDF files look exactly like the original documents because the fonts, images, graphics, and layout of the source document is preserved—regardless of the application and platform that originally created the document. An Adobe software product is used to create a PDF document, and the Adobe Acrobat or Reader is used to render and view a PDF document.

DETAILED DESCRIPTION

Figure 1:
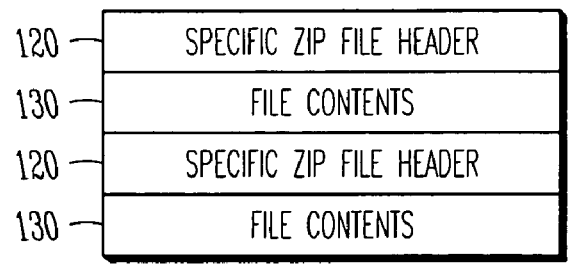
FIG. 1 is an example of a file compression format (e.g., the ZIP file format).

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

In an embodiment, a system and method constructs a file that both conforms to a file compression format (e.g., the ZIP file format), and that is recognized as valid by a page descriptor language file (e.g., Adobe Portable Document Format (PDF) file). While an example embodiment of the invention is below described with reference to the ZIP and PDF file formats, it will be appreciated that the invention is not limited to such formats. For the purposes of this embodiment, to be recognized as a valid PDF file, both current and previous versions of a PDF reader should be able to open such a file and should be able to display something from that file. In describing embodiments relating to the Adobe Portable Document format, the Adobe Acrobat and the Adobe Reader will be used interchangeably, and any reference to one should be read to include the other. Specifically, the term "an Adobe Reader" or "the Adobe Reader" includes at least both the Adobe Acrobat and the Adobe Reader.

FIG. 1 illustrates an example file format of a data compression file, in the example form of a ZIP file 100. The ZIP file 100 includes one or more segments of specific headers 120 and file contents 130 that are associated with each one of the specific headers 120. A content index 140 of the entire ZIP file is the last segment in the ZIP file 100. The content index 140 contains, among other data, the relative offset of the specific headers 120 that a particular index entry is referencing. By accessing the content index 140 at the end of the ZIP file 100, particular file contents 130 can be located.

Figure 2:
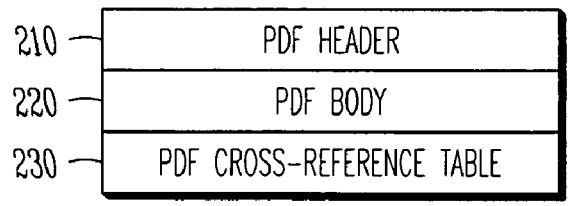
FIG. 2 is an example of a page descriptor language format (e.g. the Adobe Portable Document Format (PDF)).

FIG. 2 illustrates an example file format of a page descriptor file, in the example form of a PDF file 200. The PDF file 200 includes a header 210, a body 220, and a cross-reference table 230. The header 210 identifies the file as a PDF file. It is the header 210 that is read by a PDF reader to determine if the file is a valid PDF file. The body 220 of the PDF file 200 contains the actual data of the document, the format and other details of which are not pertinent to embodiments of the present invention. Following the body 220 is a cross-reference table 230. The cross reference table 230 contains all of the locations, as offsets from the beginning of the PDF file 200, of any particular section of the document (such as particular pages).

Figure 3:
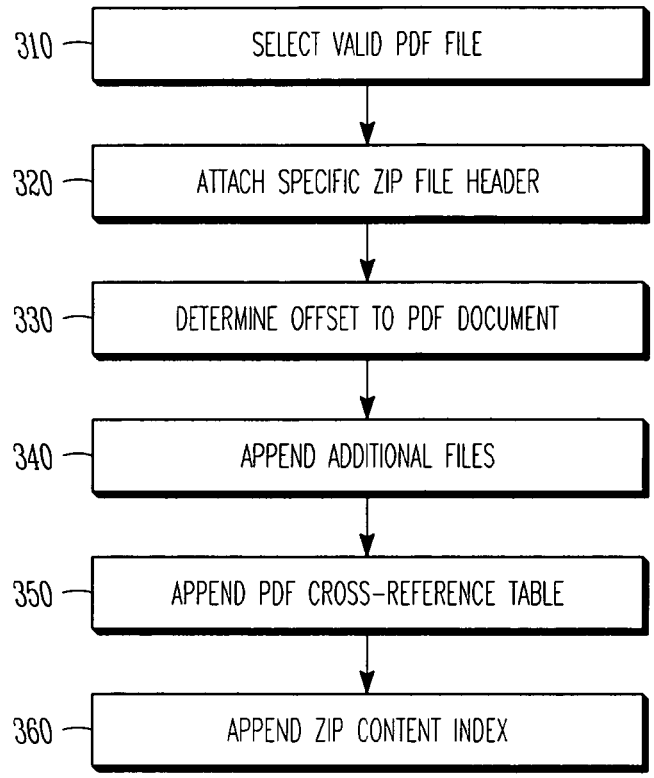
FIG. 3 is an example embodiment of a process for creating a page descriptor language format (e.g., a PDF file) with a compression file facility (e.g., a ZIP file facility).

FIG. 3 illustrates a process 300, according to an example embodiment, for creating a data compression file (e.g., a ZIP file) that will be recognized as a valid page descriptor file (e.g., a PDF file) by a PDF reader (e.g., by both current and previous versions of Adobe's Acrobat and Reader). Referring to FIG. 3, a valid PDF file is created or selected in process block 310, and a specific ZIP file header is inserted before the PDF file at processing block 320. In this embodiment, the PDF file is not compressed.

After the ZIP file header and PDF file are written to the ZIP file, the offset from the beginning of the file to the beginning of the PDF document is determined in processing block 330. This is accomplished by searching for the PDF header, which per PDF specifications is the first section of a PDF document, and maintaining a count of the bytes that precede the PDF header. In another embodiment, if the exact size of the specific ZIP file header is known, the offset is simply the size of the specific ZIP file header. In yet another embodiment, a PDF reader may automatically determine the offset of the PDF file in this ZIP-based file (by identifying the PDF header) when the file is read by the PDF reader.

In the embodiment of FIG. 3, after the specific ZIP file header and PDF file are written to the ZIP file, any additional files of any format can be appended after the PDF document at processing block 340. This appending entails writing to the file a specific ZIP file header for a file to be appended to the ZIP file, and writing the file itself to the ZIP file. These additional files, in addition to being of any format, may be compressed or uncompressed.

Figure 6:
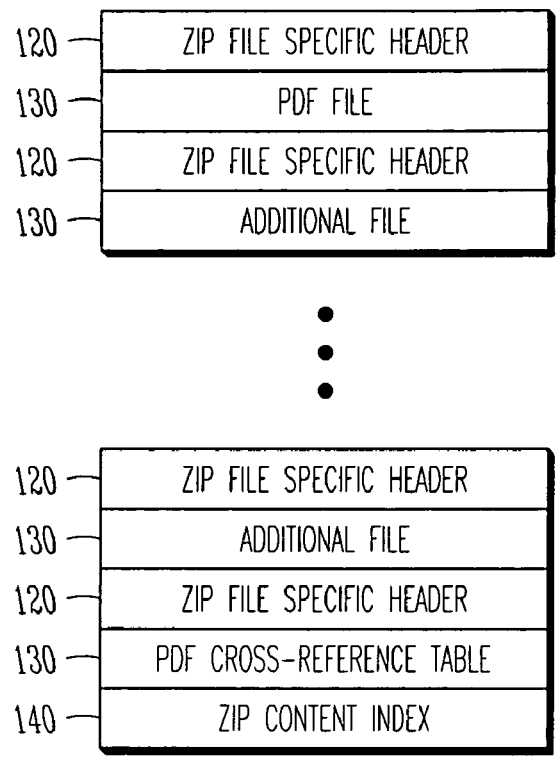
FIG. 6 is an example embodiment of a compressed file format that is compatible with a page descriptor language format (e.g., a PDF-compatible ZIP file format).

After all additional files, if any, are written to the ZIP file, a PDF cross-reference table, and a specific ZIP file header that precedes it, are written to the ZIP file at processing block 350. In an embodiment, the PDF cross-reference table contained within the PDF file that was written as the first file entry in this ZIP file is extracted and written to the ZIP file as the last file entry in the ZIP file. In an embodiment, the PDF cross-reference table is not compressed. Thereafter, a ZIP content index is appended to the end of the ZIP file at processing block 360. In an embodiment, the ZIP content index has an entry indicating the location of the PDF cross-reference table. Upon completion of the ZIP file, the offset of the PDF document that follows the first specific ZIP file header is added to the entries in the PDF cross reference tables located at the beginning and end of the ZIP file. Thereafter, these PDF cross-reference tables contain the location of the beginning of the PDF document, and also the offsets of any particular content in the PDF document. In another embodiment, the location of the PDF document in the ZIP file is determined by the PDF reader. FIG. 6 illustrates an example embodiment of a ZIP-based PDF-compatible file created by process 300 of FIG. 3.

Figure 7:
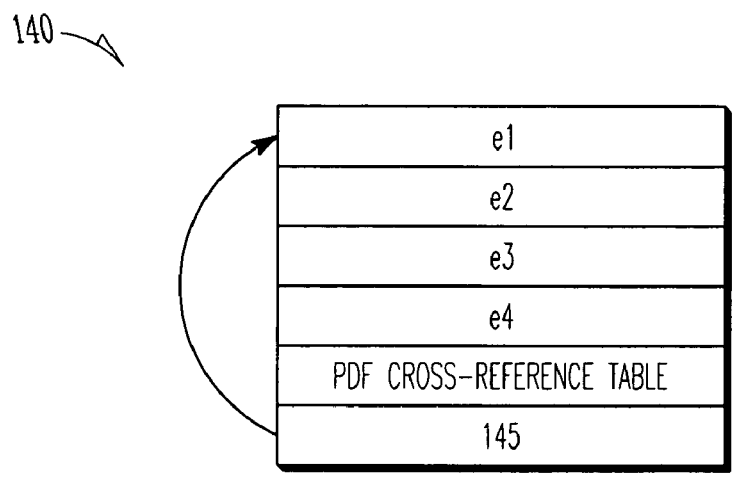
FIG. 7 is an example embodiment of compressed file index (e.g., a ZIP content index) with a cross-reference table (e.g., a PDF cross-reference table) embedded therein.

Another embodiment addresses situations in which the size of the ZIP content index is rather large. This might cause a problem for a PDF reader because there is a limit to the number of bytes that the PDF reader will read (from the end of the ZIP file) searching for the PDF cross-reference table (at the end of the ZIP file). Therefore, in this embodiment, the ZIP file is created with the format illustrated in FIG. 7. FIG. 7 illustrates in more detail an example ZIP content index 140. The ZIP content index 140 contains index entries that indicate the location of each file in the ZIP file. In FIG. 7, there are four files in the ZIP file, and their locations are indicated in the ZIP content index as e1, e2, e3, and e4. The ZIP content index includes, as the last entry in the index, a pointer 145 pointing to the start of the ZIP content index 140. Then, in this embodiment, as illustrated in FIG. 7, the PDF cross reference table is inserted between the last index entry e4 and the pointer 145.

Figure 4:
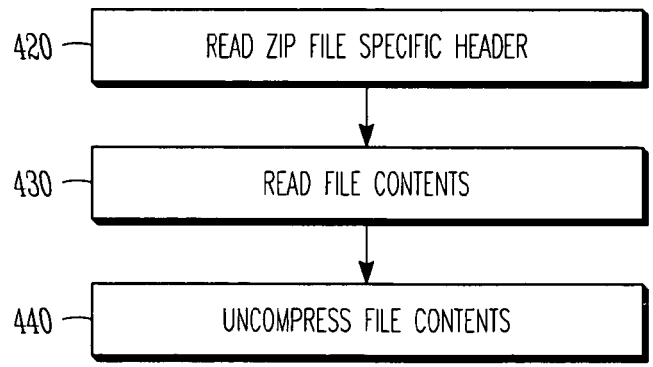
FIG. 4 is an example embodiment of a process for reading a compressed file (e.g., a ZIP file) using a compressed file facility (e.g., a ZIP file utility).

The ZIP file created by the process 300 of FIG. 3 can be unzipped and displayed by any ZIP file utility, and also may be rendered by a PDF reader. Referring to the process 400 illustrated in FIG. 4, the ZIP file utility reads through the ZIP file in processing block 420 identifying specific ZIP file headers, and in processing block 430 the process reads a specific ZIP file header's associated file. At processing block 440, the ZIP file utility will uncompress any file that has been compressed.

Figure 5:
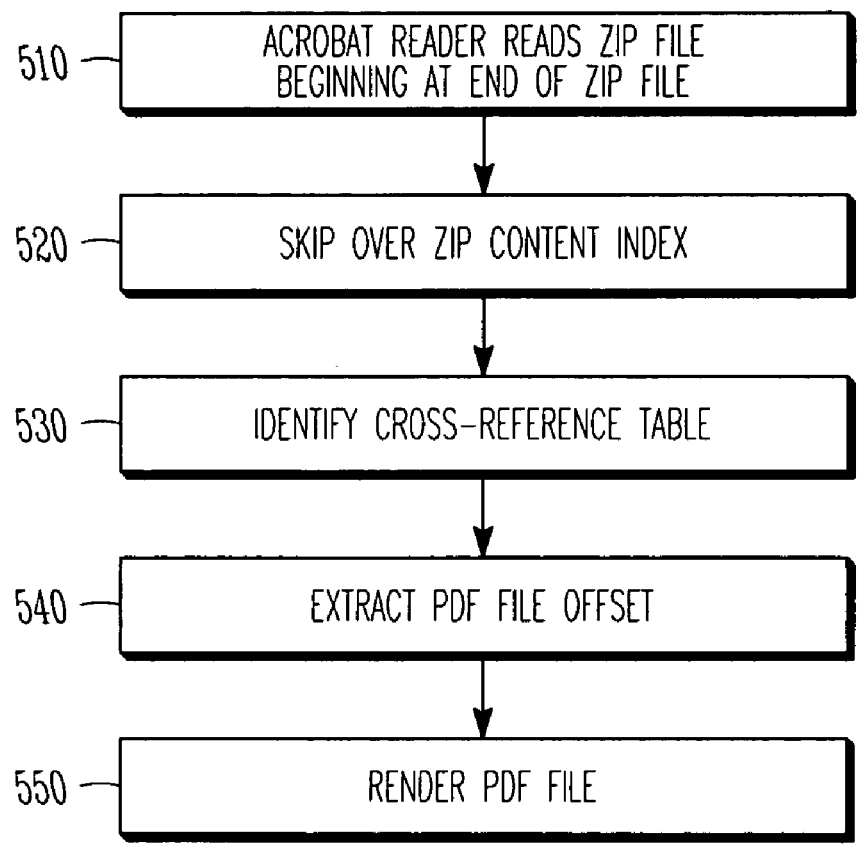
FIG. 5 is an example embodiment of a process for reading a compressed-file-based, page descriptor language format compatible, file using a page descriptor file reader (e.g., a ZIP-based PDF-compatible file using a PDF reader).

FIG. 5 illustrates an embodiment of a process 500, according to an example embodiment, in which a PDF reader may render the ZIP file created by the embodiment of FIG. 3. Specifically, the PDF reader will read the ZIP file beginning at the end of the file at processing block 510. In an embodiment, the PDF reader is looking for the cross-reference table at the end of the file so that the PDF reader can determine the offset of the PDF file in this ZIP file. Certain PDF readers will treat as "junk" any data that they encounter at the end of a file before they locate the cross-reference table (i.e., in embodiments of the invention, data appearing in the ZIP file contents index after the cross-reference table). After skipping over the ZIP content index and other ZIP data at the end of the file at processing block 520, the PDF reader identifies the cross-reference table at processing block 530, extracts the offset of the PDF file stored in the cross reference table at processing block 540, and renders the PDF file located at that offset at processing block 550. In the embodiment of FIG. 7, in which the PDF cross-reference table is inserted between the last index entry e4 and the pointer 145, the PDF reader will skip over the pointer 145 (since certain PDF readers treat such pointers about as "junk"), and identify the PDF cross-reference table encountered after the pointer 145. In another embodiment, the PDF reader identifies the entry in the ZIP contents index which contains the location of the header record for the PDF cross-reference table, and branches to the cross-reference table at that location.

Figure 8:
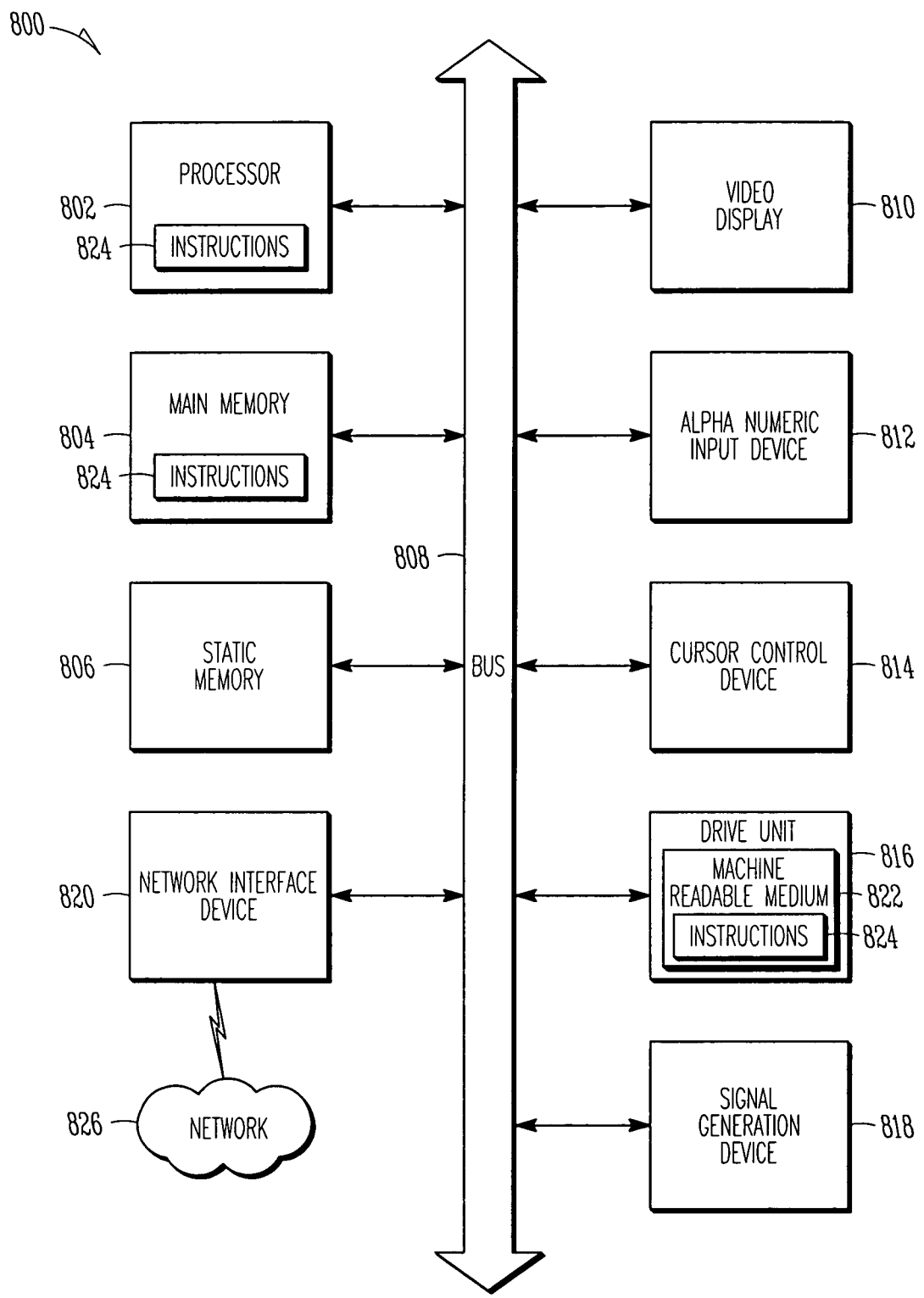
FIG. 8 is an example embodiment of a computer system upon which one or more embodiments of the invention may be executed.

FIG. 8 is a block diagram illustrating major components, according to example embodiment, of a computer system 800 within which a set of instructions, for causing the machine to perform any one or more of the methodologies discussed herein, may be executed. In an embodiment, such a computer system 800 may be used to create compressed files such as the compressed file of FIG. 1, and also may be used to execute a page descriptor language application. In alternative embodiments, the machines operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802 (e.g., a central processing unit (CPU) a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The software 824 may also reside, completely or at least partially, within the main memory 804 and/or within the processor 802 during execution thereof by the computer system 800, the main memory 804 and the processor 802 also constituting machine-readable media.

The software 824 may further be transmitted or received over a network 826 via the network interface device 820. The network 826 may be any type of wired or wireless network and the network interface device 820 may vary based on the type of network. In some embodiments, the network comprises a LAN (local area network). In alternative embodiments, the network may be a wide area network, a corporate network, or an intranet linking multiple networks. In further alternative embodiments, the network may comprise the Internet.

While the machine-readable medium 822 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, or encoding a set of instructions for execution by the machine and that cause the machine to perform any one or more of the methodologies of the present invention. The term "machine-readable medium" shall accordingly be taken to include, but not be limited to, solid-state memories, optical and magnetic media.

CONCLUSION

Systems and methods to create and process compressed files that are backwards compatible in a page descriptor language format environment have been described. Although the present invention has been described with reference to specific example embodiments, it will be evident to those of skill in the art that various modifications and changes may be made to these embodiments without departing from the broader scope of the inventive subject matter. Accordingly, the specification and drawings are to be regarded in an illustrative rather than a restrictive sense. Many other embodiments will be apparent to those of skill in the art upon reviewing the above description. Therefore, it is manifestly intended that this invention be limited only by the following claims and equivalents thereof.

For example, in the description herein of a system and method to create a PDF-compatible file using a ZIP file utility, it is noted that the particular order of the steps used to create the PDF-compatible ZIP file is not crucial, and those of skill in the art will realize that the order of steps could be rearranged. Therefore, the appended method claims are not be limited to the order as presented in the claim, but should be read to cover any order. See e.g., *Altiris, Inc. v. Symantec Corp.*, 318 F.3d 1363, 1369 (Fed. Cir. 2003).

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

What is claimed is:

1. A method comprising:
   incorporating a document in a page descriptor format into a compressed file, said compressed file comprising a first file header, a second file header, and a contents index, said first file header being located at the beginning of said compressed file and being associated with said document in page descriptor format, said document in a page descriptor format being located after said first file header, said second file header being located after said document in a page descriptor format, and said contents index being located after a copy of a cross-reference table; and calculating an offset into said compressed file of said document in a page descriptor format;

writing the copy of the cross-reference table associated with said document in a page descriptor format to said compressed file, said copy of said cross-reference table is associated with said second file header and located after said second file header;

updating values in said copy of said cross reference table based on said offset;

providing a reader to render said document in a page descriptor format;

reading said compressed file beginning at the end of said compressed file;

skipping over said contents index at the end of said compressed file;

identifying said copy of said cross-reference table;

extracting one of said values from said copy of said cross-reference table; and rendering said document in a page descriptor format beginning at a location identified by said one of said values.

2. The method of claim 1, further comprising:
providing a file utility to uncompress and display the contents of said compressed file.

3. The method of claim 1, wherein said offset is determined by the size of said first file header.

4. The method of claim 1, wherein said offset is determined by:
searching through said compressed file for said document in a page descriptor format; and
identifying the location of a header in said document in a page descriptor format.

5. The method of claim 1, wherein said compressed file comprises a ZIP file format.

6. The method of claim 1, wherein said document in a page descriptor format comprises a Portable Document Format.

7. A machine readable medium comprising instructions thereon for executing a method comprising:
incorporating a document in a page descriptor format into a compressed file,
said compressed file comprising a first file header, a second file header, and a contents index and
said document in a page descriptor format is associated with said first file header;
calculating an offset into said compressed file of said document in a page descriptor format;
writing a copy of a cross-reference table associated with said document in a page descriptor format to said compressed file, said copy of said cross-reference table is associated with said second file header;
updating values in said copy of said cross reference table based on said offset;
providing a reader to render said document in a page descriptor format;
reading said compressed file beginning at the end of said compressed file;

skipping over said contents index at the end of said compressed file;
identifying said copy of said cross-reference table;
extracting one of said values from said copy of said cross-reference table; and
rendering said document in a page descriptor format beginning at a location identified by said one of said values.

8. The machine readable medium of claim 7, further comprising instructions for:
providing a file utility to uncompress and display the contents of said compressed file.

9. The machine readable medium of claim 7, wherein
said first file header is located at the beginning of said compressed file;
said document in a page descriptor format is located after said first file header;
said second file header is located after said document in a page descriptor format;
said copy of said cross-reference table is located after said second file header; and
said contents index is located after said copy of said cross-reference table.

10. The machine readable medium of claim 7, further comprising instructions for:
uncompressing said compressed file.

11. The machine readable medium of claim 7, wherein said compressed file comprises a ZIP file format.

12. The machine readable medium of claim 7, wherein said document in a page descriptor format comprises a Portable Document Format.

13. A system comprising:
a processor;
a memory;
a display unit;
a compressed filed stored in said memory, said compressed file comprising,
a first file header being located at the beginning of said compressed file and being associated with said document in page descriptor format,
a document in a page descriptor format located after said first file header at an offset from the beginning of said compressed file, and
a second file header being located after said document in a page descriptor format, and
a contents index being located after a copy of a cross-reference table; and
a copy of a cross-reference table associated with said document in a page descriptor format, wherein values in said copy of said cross-reference table comprise updated values based on said offset, said copy of said cross-reference table is associated with said second file header and located after said second file header; and
a utility to read said compressed file beginning at the end of said compressed file, skip over said content index at the end of said compressed file, identify said copy of said cross-reference table, extract a value associated with said document in a page descriptor format from said copy of said cross-reference table, and render a portion of said document in a page descriptor format identified by said value.

14. The system of claim 13, further comprising:
a first file header associated with said document in a page descriptor format;
a second file header associated with said table; and
a contents index.

15. The system of claim 14, wherein
said first file header is located at the beginning of said compressed file;
said document in a page descriptor format is located after said first file header;
said second file header is located after said document in a page descriptor format;
said copy of said cross-reference table is located after said second file header; and
said contents index is located after said copy of said cross-reference table.

16. The system of claim 13, wherein
said compressed file format comprises a ZIP file; and further wherein
said document in a page descriptor format comprises a Portable Document Format.

17. A method comprising:
incorporating a document in a page descriptor format into a compressed file,
said compressed file comprising a first file header, a second file header, and a contents index,
said first file header being located at the beginning of said compressed file and being associated with said document in page descriptor format,
said document in a page descriptor format being located after said first file header,
said second file header being located after said document in a page descriptor format, and
said contents index being located after a copy of a cross-reference table; and
calculating an offset into said compressed file of said document in a page descriptor format;
writing the copy of the cross-reference table associated with said document in a page descriptor format to said compressed file, said copy of said cross-reference table is associated with said second file header and located after said second file header;
updating values in said copy of said cross reference table based on said offset;
providing a reader to render said document in a page descriptor format;
said reader reading said contents index;
said reader identifying an entry in said contents index containing a location for
said copy of said cross-reference table;
said reader branching to said location and reads said copy of said cross-reference table;
said reader extracting one of said values in said copy of said cross-reference table; and
said reader rendering a portion of said document in a page descriptor format identified by said one of said values.

18. The method of claim 17, further comprising:
providing a file utility to uncompress and display the contents of said compressed file.

19. The method of claim 17, wherein said offset is determined by the size of said first file header.

20. The method of claim 17, wherein said offset is determined by:
searching through said compressed file for said document in a page descriptor format; and
identifying the location of a header in said document in a page descriptor format.

21. The method of claim 17, wherein said compressed file comprises a ZIP file format.

22. The method of claim 17, wherein said document in a page descriptor format comprises a Portable Document Format.

23. A machine readable medium comprising instructions thereon for executing a method comprising:
incorporating a document in a page descriptor format into a compressed file,
said compressed file comprising a first file header, a second file header, and a contents index and
said document in a page descriptor format is associated with said first file header;
calculating an offset into said compressed file of said document in a page descriptor format;
writing a copy of a cross-reference table associated with said document in a page descriptor format to said compressed file, said copy of said cross-reference table is associated with said second file header;
updating values in said copy of said cross reference table based on said offset;
providing a reader to render said document in a page descriptor format;
said reader reading said contents index;
said reader identifying an entry in said contents index containing a location for said copy of said cross-reference table;
said reader branching to said location and extracts said one of said values associated with said document in a page descriptor format; and
said reader rendering a portion of said document in page descriptor format identified by said one of said values.

24. The machine readable medium of claim 23, further comprising instructions for:
providing a file utility to uncompress and display the contents of said compressed file.

25. The machine readable medium of claim 23, wherein
said first file header is located at the beginning of said compressed file;
said document in a page descriptor format is located after said first file header;
said second file header is located after said document in a page descriptor format;
said copy of said cross-reference table is located after said second file header; and
said contents index is located after said copy of said cross-reference table.

26. The machine readable medium of claim 23, further comprising instructions for:
uncompressing said compressed file.

27. The machine readable medium of claim 23, wherein said compressed file comprises a ZIP file format.

28. The machine readable medium of claim 23, wherein said document in a page descriptor format comprises a Portable Document Format.

29. A system comprising:
a processor;
a memory;
a display unit;
a compressed filed stored in said memory, said compressed file comprising,
a first file header associated with said document in a page descriptor format located at the beginning of said compressed file, a document in a page descriptor format located after said first file header at an offset from the beginning of said compressed file, a second file header associated with said table, said second file header being located after said document in a page descriptor format, a copy of a cross-reference table associated with said document in a page descriptor format, wherein values in said copy of said cross-reference table comprise updated values based on said offset, said copy of said cross-reference table is associated with said second file header and located after said second file header, and a contents index located after the copy of a cross-reference table; and a utility to read said contents index, to identify a location in said contents index containing a location for said copy of said cross-reference table, to branch to said location, to extract said value associated with said document in a page descriptor format from said copy of said cross-reference table, and to render a portion of said document in a page descriptor format identified by said value.

30. The system of claim 29, further comprising:
a first file header associated with said document in a page descriptor format;
a second file header associated with said table; and
a contents index.

31. The system of claim 29, wherein
said first file header is located at the beginning of said compressed file;
said document in a page descriptor format is located after said first file header;
said second file header is located after said document in a page descriptor format;
said copy of said cross-reference table is located after said second file header; and
said contents index is located after said copy of said cross-reference table.

32. The system of claim 29, wherein
said compressed file format comprises a ZIP file; and further wherein
said document in a page descriptor format comprises a Portable Document Format.

* * * * *

UNITED STATES PATENT AND TRADEMARK OFFICE
CERTIFICATE OF CORRECTION

PATENT NO. : 7,594,169 B2 Page 1 of 1
APPLICATION NO. : 11/207684
DATED : September 22, 2009
INVENTOR(S) : Oliver Goldman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1038 days.

Signed and Sealed this

Fourteenth Day of December, 2010

David J. Kappos
*Director of the United States Patent and Trademark Office*